(12) United States Patent
Benight

(10) Patent No.: US 9,667,982 B2
(45) Date of Patent: May 30, 2017

(54) TECHNIQUES FOR TRANSFORM BASED TRANSCODING

(71) Applicant: NetApp Inc., Sunnyvale, CA (US)

(72) Inventor: Barry Benight, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 576 days.

(21) Appl. No.: 14/044,010

(22) Filed: Oct. 2, 2013

(65) Prior Publication Data

US 2015/0092860 A1   Apr. 2, 2015

(51) Int. Cl.
*H04N 19/40* (2014.01)
*H04N 19/48* (2014.01)
*H04N 19/547* (2014.01)

(52) U.S. Cl.
CPC ............ *H04N 19/40* (2014.11); *H04N 19/48* (2014.11); *H04N 19/547* (2014.11)

(58) Field of Classification Search
CPC ...... H04N 19/40; H04N 19/48; H04N 19/547; H04N 19/134; H04N 19/169; H04N 19/184
USPC .................................... 375/240.18
See application file for complete search history.

(56) References Cited

U.S. PATENT DOCUMENTS

| | | | |
|---|---|---|---|
| 7,991,053 B2* | 8/2011 | Raveendran ......... | H04N 19/176 375/240.01 |
| 2003/0103573 A1* | 6/2003 | Woo ...................... | H04N 19/00 375/245 |
| 2003/0206717 A1 | 11/2003 | Yogeshwar et al. | |
| 2006/0133674 A1* | 6/2006 | Shibata ................... | H04N 7/15 382/232 |
| 2010/0260262 A1* | 10/2010 | Coban ................. | H04N 19/139 375/240.13 |
| 2012/0254417 A1* | 10/2012 | Luna ................... | H04L 67/2828 709/224 |

* cited by examiner

*Primary Examiner* — Mohammed Rahaman
*Assistant Examiner* — Jimmy S Lee
(74) *Attorney, Agent, or Firm* — Gilliam IP PLLC

(57) ABSTRACT

Techniques for transform based transcoding are described. A transcoding application may manage transcoding operations for media files. The transcoding application may comprise a file transcoder component to transcode a media file from a first compressed state corresponding to a first compression technique to a second compressed state corresponding to a second compression technique, wherein the second compression technique performs compression in a transform domain. Other embodiments are described and claimed.

13 Claims, 16 Drawing Sheets

*1200*

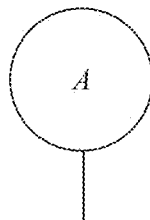

IDENTIFY A SET OF MATCHING COEFFICIENTS BETWEEN A FIRST DATA BLOCK AND A SECOND DATA BLOCK OF THE VIDEO COMPONENT
*1202*

COMPUTE A SET OF DIFFERENTIAL VALUES FOR A SET OF MATCHED COEFFICIENTS BETWEEN A FIRST DATA BLOCK AND A SECOND DATA BLOCK OF THE VIDEO COMPONENT
*1204*

COMPARE A FIRST NUMBER OF BITS NEEDED TO ENCODE A SET OF DIFFERENTIAL VALUES FOR A SET OF MATCHED COEFFICIENTS BETWEEN A FIRST DATA BLOCK AND A SECOND DATA BLOCK OF THE VIDEO COMPONENT AND A SECOND NUMBER OF BITS NEEDED TO ENCODE THE FIRST DATA BLOCK OF THE VIDEO COMPONENT
*1206*

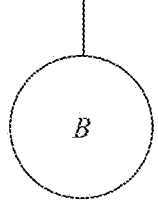

*FIG. 12*

TECHNIQUES FOR TRANSFORM BASED TRANSCODING

BACKGROUND

Transcoding refers to a process of converting a media file, such as a video and/or audio file, from one format to another format. This may be done in cases where a target device does not support a given format, reduce file size, edit a file, and other media operations. In the case of reducing file size, raw media files are recorded in increasingly higher levels of resolution. This increase in resolution leads to a corresponding increase in file size. For instance, a two-hour movie stored in a common format such as digital picture exchange (DPX) may be 8 terabytes (TB) in size. File sizes of this magnitude can increase cost and complexity in storing and transporting media files. To compensate, a media file may be transcoded or compressed into a smaller file size. For example, a compression technique such as Joint Photographic Experts Group (JPEG) 2000 may reduce file size by half. As such, improvements to transcoding techniques may provide significant technical advantages.

BRIEF DESCRIPTION OF THE DRAWINGS

FIG. 12 illustrates an embodiment of a second logic flow.

DETAILED DESCRIPTION

Figure 1:
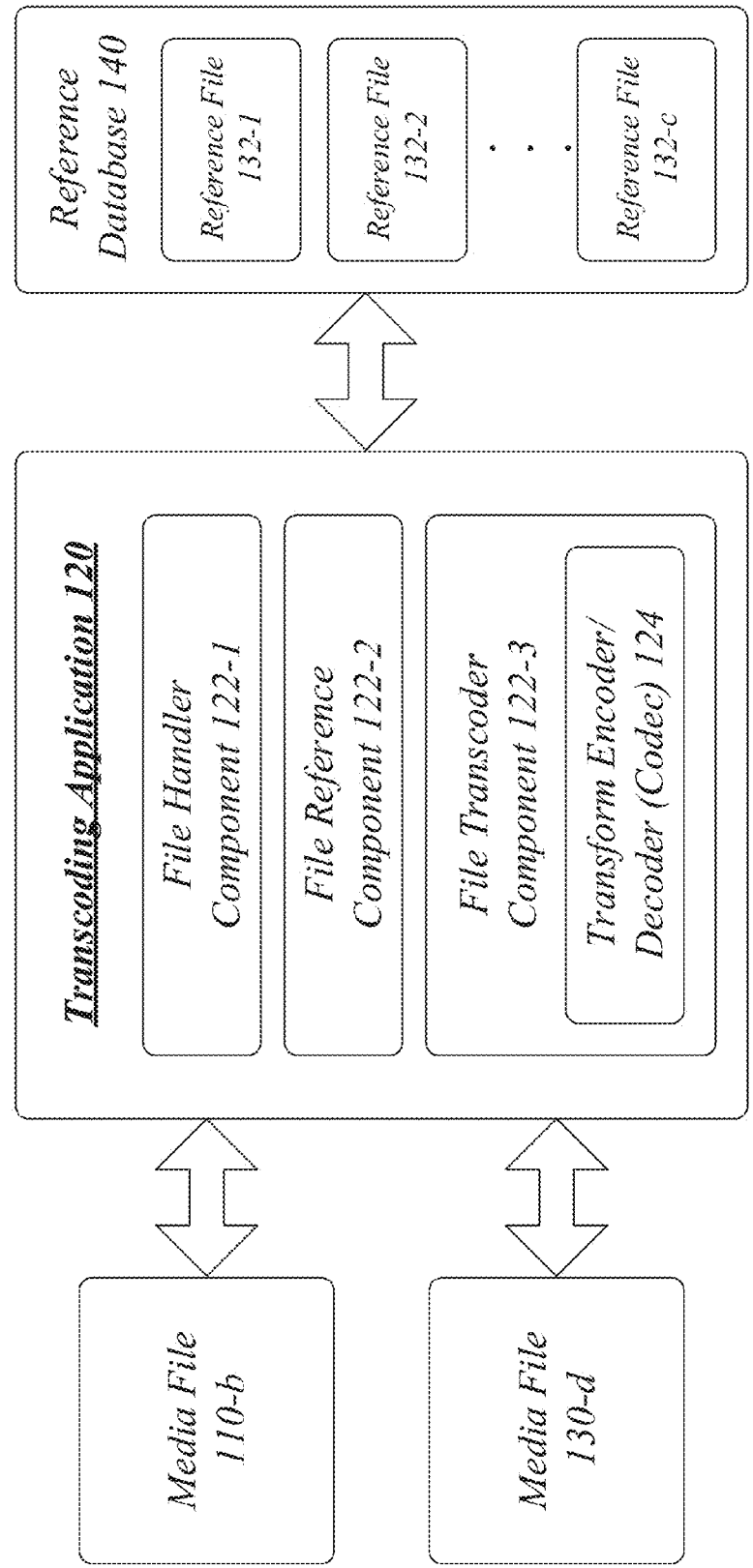
FIG. 1 illustrates an embodiment of an apparatus.

Various embodiments are generally directed to enhanced transcoding techniques to efficiently and effectively transcode media files between different file formats. Some embodiments are particularly directed to enhanced transcoding techniques to transcode a media file utilizing a transform-based coding technique.

To transcode a compressed file, a decoder is typically used to convert the compressed file from a transform domain to a spatial domain. An encoder is then used to encode the decompressed file into a target format while operating in the spatial domain. The decoding and encoding operations may consume significant amounts of compute, memory and storage resources for a device. It also may increase latency for transcoding operations.

In transform-based coding, a compressed media file may be transcoded fully or partially within a transform domain rather than a spatial domain. For instance, when a frame of a media file is compressed using a wavelet transform to produce a set of coefficients, interframe compression techniques may be used to reduce a number of bits needed to represent the set of coefficients. In some cases, this presumes that the original compression algorithm used to create the compressed media file did not previously use interframe compression. Operating in a transform domain reduces or eliminates the decode/encode process used by conventional compression algorithms.

Transform-based coding provides significant technical advantages over conventional transcoding techniques. For instance, transform-based coding may provide lossless (or selective lossy) compression of a video sequence already encoded in a given compression format. In a lossless mode, the transform-based coding technique allows a bit-for-bit equivalence of input and output files (or streams). In one embodiment, for example, the enhanced transcoding techniques may be implemented to more efficiently reduce file sizes for a storage network, such as a storage area network (SAN) or a network attached storage (NAS) environment. In some cases, file sizes may be reduced by 80-90% using transform-based coding. Furthermore, transcoding latency may be significantly reduced as there is no need to convert a compressed file into the spatial domain prior to performing compression. This may be particularly important for storage systems as it may reduce file access times. As a result, transform-based coding techniques may decrease transcoding time and reduce consumption of system resources, among other advantages.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an apparatus 100. In one embodiment, the apparatus 100 may comprise a computer-implemented apparatus 100 having a software application 120 comprising one or more components 122-a. Although the apparatus 100 shown in FIG. 1 has a limited number of elements in a certain topology, it may be appreciated that the apparatus 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-a may include components 122-1, 122-2, 122-3, 122-4 and 122-5. The embodiments are not limited in this context.

The apparatus 100 may comprise a transcoding application 120. The transcoding application 120 may be implemented using any number of programming languages or software frameworks. The transcoding application 120 may be generally arranged to manage transcoding operations for a storage network or system, such as a NAS or SAN. The apparatus 100 in general, and the transcoding application 120 in particular, may be suitable for implementation by an electronic device, such as those described with reference to FIG. 8-10, 15 or 16, among others.

In one embodiment, the transcoding application 120 may comprise a file handler component 122-1, a file reference component 122-2, and a file transcoder component 122-3. The file transcoder component 122-3 may further comprise a transform encoder/decoder (codec) 124. The transcoding application 120 may comprise more or less components as needed for a given implementation. Embodiments are not limited in this context.

The file handler component 122-1 may generally manage one or more media files 110-b for the transcoding application 120. This may include handling any file management requests such as locating a media file 110, retrieving a media file 110, storing a media file 110, sending a media file 110, naming a media file 110, deleting a media file 110, recovering a deleted or corrupted media file 110, and so forth.

A media file 110 may comprise any data structure stored in memory (e.g., a file, a table, an array, a queue, a stack, a linked list, etc.) containing multimedia information, such as audio information, video information, combination of audio/video information, tactile information, olfactory information, images, animations, movies, pictures, songs, speech, and so forth. The multimedia information may be two-dimensional (2D) information or three-dimensional (3D) information. The multimedia information may be of any resolution or quality as desired. The embodiments are not limited in this context.

The file reference component 122-2 may generally manage one or more reference files 132-c associated with a corresponding media file 110-b. In one embodiment, a reference file 132 may be stored in a reference database 140. In one embodiment, a reference file 132 may be stored in a media file 110. A reference file 132 may include one or more reference parameters for a corresponding media file 110. The file reference component 122-2 may analyze a media file 110 to generate reference parameters, create a reference file 132 for reference parameters, store a reference file 132, retrieve a reference file 132, send a reference file 132, name a reference file 132, delete a reference file 132, recover a reference file 132, and so forth.

During transcoding operations, the transcoding application 120 may need to determine various reference parameters for a media file 110. For instance, the transcoding application 120 may need to determine a group of pictures (GOP) structure, reference image structure, prediction mode selection, reference selection, motion estimation, and other types of reference information. The file reference component 122-2 may determine the reference parameters in real-time prior to transcoding operations for a media file 110. Alternatively, the file reference component 122-2 may determine in advance a set of reference parameters for a media file 110, and then store the reference parameters with a globally unique identifier (GUID) in a reference file 132. The reference file 132 may then be used for every transcoding instance involving the media file 110. The reference file 132 may also be used to transcode the media file 110 into one or more media files 130-d of varying levels of resolution, thereby allowing scalable video file sizes and data streams of varying bit rates.

The file reference component 122-2 may generate a reference parameter for each feature, attribute, property, characteristic or aspect of a media file 110, including reference parameters representing file formats, compression/decompression (codecs), motion prediction, motion estimation, file structure, frame structure, block structure, packet structure, and so forth. In one embodiment, a set of reference parameters may include without limitation a group of pictures (GOP) structure parameter, a reference image structure parameter, a prediction mode selection parameter, a reference selection parameter, or a motion estimation parameter. Embodiments are not limited in this context.

The file transcoder component 122-3 may generally manage transcoding operations for one or more media files 110. The file transcoder component 122-3 may transcode a media file 110 between different formats. For instance, the file transcoder component 122-3 may transcode a media file 110 in a first compressed state corresponding to a first compression technique to a media file 130 in a second compressed state corresponding to a second compression technique.

In one embodiment, the first compression technique may comprise a non-interframe compression technique. Interframe compression is used for compressing video frames. Interframe compression attempts to compress a current frame using information from one or more frames in a same frame sequence as the current frame. By way of contrast, intraframe compression attempts to compress a current frame using information from only the current frame. A non-interframe compression technique is a compression technique that does not use interframe compression, such as an intraframe compression technique, for example. Specific examples of non-interframe compression techniques may include without limitation the International Organization for Standardization (IOS)/International Electrotechnical Commission (IEC) 15444 family of standards (e.g., JPEG, JPEG2000) ("JPEG Standards"), the International Electrotechnical Commission (IEC) 61834 family of standards (e.g., Digital Video (DV) standard) ("DV Standards"), and so forth. Embodiments are not limited in this context.

The second compression technique may comprise a transform-based coding technique designed to perform compression operations in a transform domain. A transform domain may comprise any data set created using a mathematical transform. Examples of mathematical transforms may include a Fourier transform, discrete Fourier transform, Laplace transform, Z transform, wavelet transform, orthonormal wavelet transform, integral wavelet transform, and so forth. Embodiments are not limited in this context.

In one embodiment, for instance, the second compression technique may comprise a transform-based coding technique designed to perform compression operations in a media transform domain. A media transform domain may comprise a transform domain where media information from a media file is compressed using one or more wavelet transforms to generate coefficients. In some cases, the coefficients may be quantized to reduce a number of bits used to represent the coefficients.

The transform-based coding techniques may emulate a non-interframe or interframe compression technique modified to operate in a transform domain. In one embodiment, for example, the second compression technique may comprise an interframe compression technique. Specific examples of interframe compression techniques may include without limitation the International Telecommunication Union (ITU) Telecommunication Standardization Sector (ITU-T) H.264 family of standards ("H.264 Standards"), the ISO/IEC 14496-10 Moving Picture Experts Group (MPEG)-4 Advanced Video Coding (AVC) Standard (formally ISO/IEC 14496-10—MPEG-4 Part 10, AVC) ("MPEG-4 AVC Standards"), and so forth. A project partnership effort known as the Joint Video Team (JVT), comprised of the ITU-T Video Coding Experts Group (VCEG) together with the ISO/IEC Joint Technical Committee 1 (JTC1) MPEG, maintains the H.264 Standards and the MPEG-4 AVC Standards so that they have identical content. As such, both standards are sometimes referred to as the H.264/MPEG-4 AVC family of standards. Embodiments are not limited in this context.

In general operation, the transcoding application 120 may operate in at least two modes. The first mode is used to generate a reference file 132 for a media file 110. The transcoding application 120 may store the reference file 132 in the reference database 140. Alternatively, the transcoding application 120 may encode the reference file as part of the media file 110. The second mode is used to transcode a media file 110 utilizing a previously generated reference file 132 for the media file 110, or alternatively, with the file reference component 122-2 generating the reference file 132 in real-time during encoding of the media file 110.

In either mode, the transcoding application 120 may retrieve the reference file 132 from the reference database 140. Alternatively, the transcoding application 120 may decode the reference file from the media file 110. In typical implementations, the first mode and the second mode are performed in sequence and are separated by a defined time interval. The defined time interval is a configurable parameter, thereby allowing real-time and non-real-time implementations. For instance, the first mode may be used to process multiple media files 110 and store corresponding reference files 132 long in advance of when any transcoded versions are needed. In another example, the first mode may be used to process a media file 110 and store a corresponding reference file 132 when a transcoding request is received by the transcoding application 120. Once computed, the reference file 132 may be re-used for each transcoded version as needed.

Figure 2:
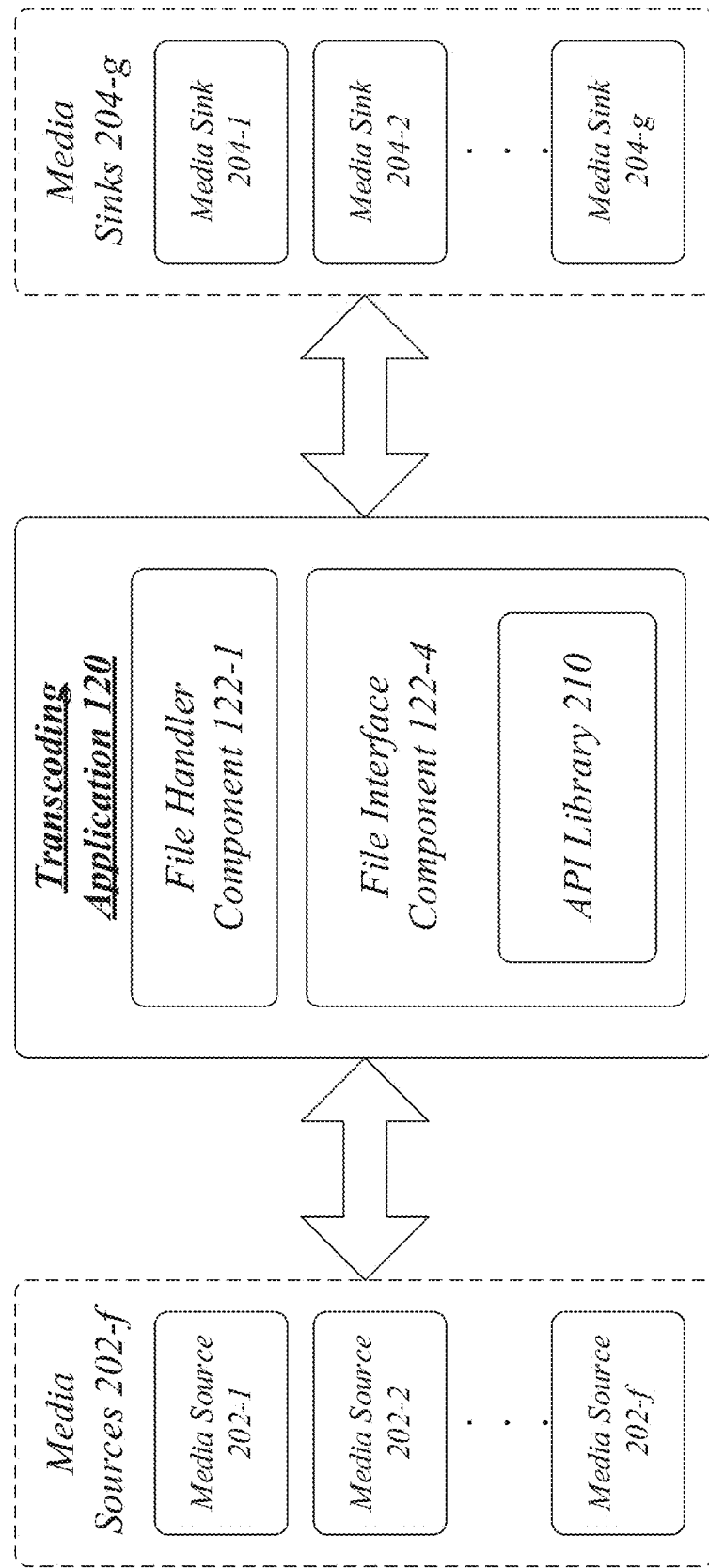
FIG. 2 illustrates an embodiment of a first operational environment for the apparatus.

FIG. 2 illustrates an embodiment of an operational environment 200 for the apparatus 100. More particularly, the operational environment 200 illustrates a case where the transcoding application 120 communicates with other devices, such as a set of media sources and media sinks, for example.

As shown in FIG. 2, the transcoding application 120 may include a file interface component 122-4. The file interface component 122-4 may include an application program interface (API) library 210. The API library 210 may comprise a set of APIs that allows the file handler component 122-1 to communicate with one or more media sources 202-$f$ and one or more media sinks 204-$g$. The API library 210 may also comprise a set of APIs to allow the file reference component 122-2 to communicate with the reference database 140. The reference database 140 may be implemented using any suitable database technology, such as a relational database management system (RDMS), for example. The API library 210 may be selected for compatibility with a given device or database technology.

When the file handler component 122-1 receives a transcoding request to perform transcoding operations for media file 110, the file handler component 122-1 may retrieve the media file 110 from a media source 202. The file handler component 122-1 may initiate transcoding operations by storing a work item in a queue for the file reference component 122-2. The file handler component 122-1 may notify the file reference component 122-2 of the new work item, or alternatively, the file reference component 122-2 may monitor a work queue for presence of any new work items. The monitoring may be on a periodic, aperiodic, continuous or on-demand basis.

Once transcoding operations are complete, and a new transcoded media file 130 is ready for consumption, the file handler component 122-1 may receive a request to send the media file 130 to a media sink 204. The file handler component 122-1 may retrieve the media file 130, and forward the media file 130 to the media sink 204.

As an intermediary between a media source 202 and a media sink 204, the file handler component 122-1 may be in a position to ensure transcoding operations performed on the media file 110 to generate the media file 130 match requirements of the media sink 204 or communication link with the media sink 204. For instance, a transcoding request may have information about the media source 202 and/or the media sink 204 that impacts transcoding operations performed by the transcoding application 120. For instance, the transcoding request may have device information about the media sink, such as screen size or screen resolution. In another example, the transcoding request may have network information about a communications link with the media sink, such as bandwidth constraints. The file handler component 122-1 may include this information in a work item, which the file transcoder component 122-3 may use to determine a particular type of compression technique used for the media file 110.

Figure 3:
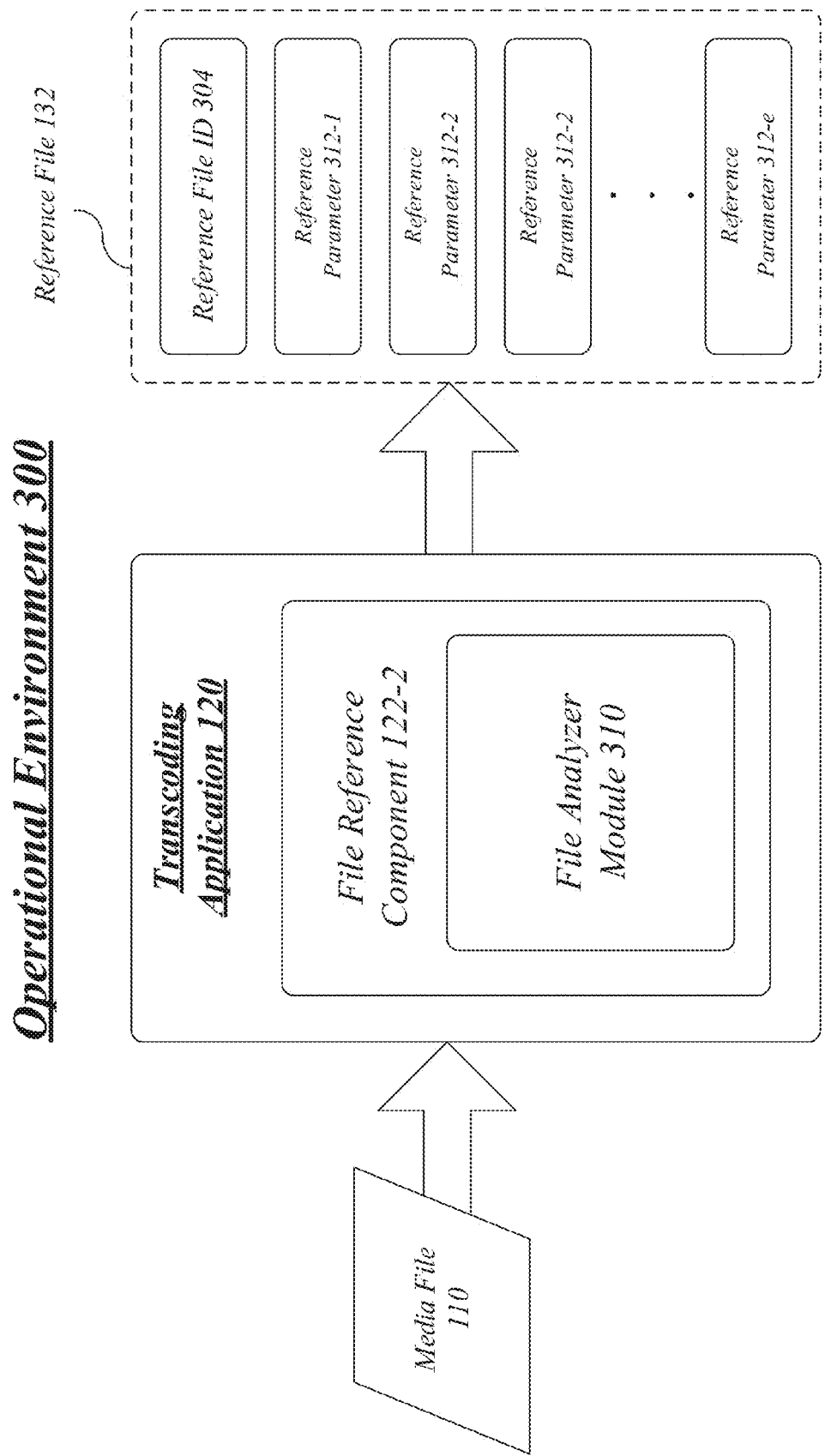
FIG. 3 illustrates an embodiment of a second operational environment for the apparatus.

FIG. 3 illustrates an embodiment of an operational environment 300 for the apparatus 100. More particularly, the operational environment 300 illustrates a case where the file reference component 122-2 of the transcoding application 120 operates in a first mode to generate a reference file 132 for a media file 110.

As shown in FIG. 3, the file reference component 122-2 may receive a media file 110. The file reference component 122-2 may utilize a file analyzer module 310 to analyze the media file 110 to ascertain a set of reference parameters 312-e. The file analyzer module 310 may determine reference parameters 312 based on intrinsic information contained within the media file 110. Examples of intrinsic information may include without limitation media information, control information, encoder information, decoder information, compression information, motion estimation information, motion detection information, intraframe coding information, interframe coding information, metadata, and any other information contained within the logical or physical boundaries of the media file 110. The file analyzer module 310 may also analyze the media file 110 based on extrinsic information associated with the media file 110. Examples of extrinsic information may include without limitation metadata, storage device information, source device information, target device information, network information, network address information, security information, profile information, user information, ownership information, policy information, copyright information, permission information, distribution information, geographic information, and any other information outside of the logical or physical boundaries of the media file 110. Embodiments are not limited to these examples.

In the first mode, the file analyzer module 310 may analyze a media file 110 and generate a set of reference parameters 312 associated with the media file 110. The reference parameters 312 may be used to assist in transcoding the media file 110 between first and second compression states corresponding to first and second compression techniques, respectively. The file reference component 122-2 may then store the reference parameters 312 as part of a reference file 132. The file reference component 122-2 may include a reference file identifier (ID) 204 to assist in associating the media file 110 with the corresponding reference file 132.

Figure 4:
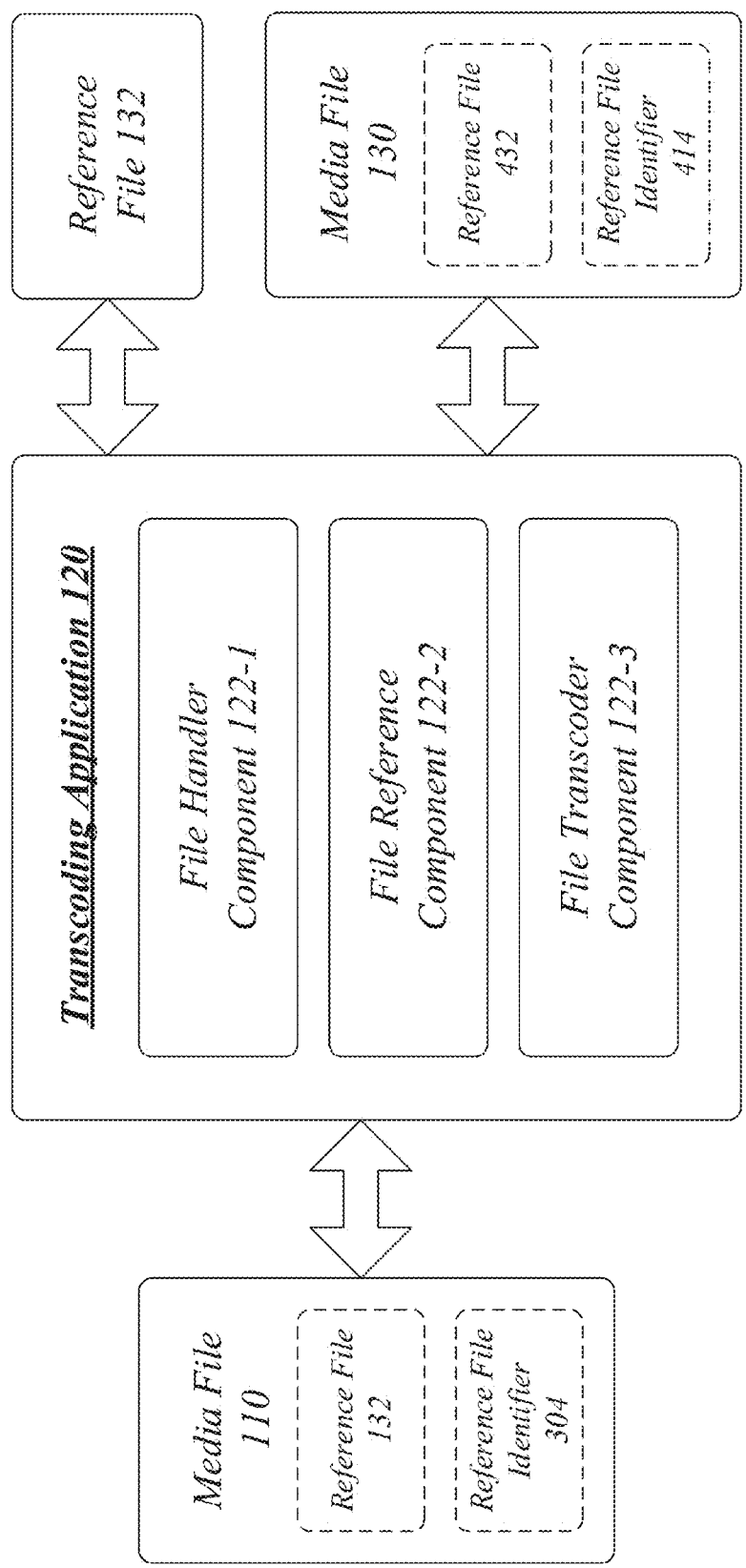
FIG. 4 illustrates an embodiment of a third operational environment for the apparatus.

FIG. 4 illustrates an embodiment of an operational environment 400 for the apparatus 100. More particularly, the operational environment 400 illustrates a case where the transcoding application 120 operates in a second mode to transcode a media file 110 utilizing a reference file 132 for the media file 110.

As shown in FIG. 4, the file handler component 122-1 may receive a media file 110. The media file 110, in its raw form, may comprise a digital cinema file in a format suitable for motion picture films as specified by the Digital Cinema Initiatives (DCI) project, such as the DCI Digital Cinema System Specification, Version 1.2, dated Mar. 7, 2008 ("DCS Specification"). Based on many Society of Motion Picture and Television Engineers (SMPTE) and ISO standards, such as JPEG 2000-compressed image and "broadcast wave" pulse code modulation (PCM)/waveform audio file format (WAV) sound, the DCS Specification details how to create an entire Digital Cinema Package (DCP) from a raw collection of files known as the Digital Cinema Distribution Master (DCDM), as well as the specifics of its content protection, encryption, and forensic marking. The DCS Specification also establishes standards for the decoder requirements and the presentation environment itself, such as ambient light levels, pixel aspect and shape, image luminance, white point chromaticity, and those tolerances to be kept. Even though it specifies what kind of information is required, the DCI Specification does not include specific information about how data within a distribution package is to be formatted. Formatting of this information is defined by various digital cinema standards, such as a Cineon file format or a SMPTE Digital Picture Exchange (DPX) file format, for example.

The file handler component 122-1 may receive a media file 110 in a first compressed state corresponding to a first compression technique. The first compression technique may comprise a lossy or lossless compression technique as desired for a given level of quality and resolution. In one embodiment, the first compression technique may comprise a non-interframe compression technique. For instance, the non-interframe compression technique may comprise one or more JPEG2000 Standards used to compress the media file 110. JPEG2000 may perform lossless compression on the media file 110.

The file reference component 122-2 may retrieve a reference file 132 with a set of reference parameters 312 associated with the media file 110. The file reference component 122-2 may retrieve the reference file 132 from the media file 110. Alternatively, the file reference component 122-2 may retrieve a reference file ID 404 from the media file 110, and retrieve the reference file 132 from the reference database 140 utilizing the reference file ID 404.

The reference file 132 may comprise a set of reference parameters 312-e for the media file 110. For instance, the set of reference parameters 312-e may comprise one or more of a group of pictures (GOP) structure parameter 312-1, a reference image structure parameter 312-2, a prediction mode selection parameter 312-3, a reference selection parameter 312-4, or a motion estimation parameter 312-5. Other reference parameters 312-e may be present as needed for a given implementation.

The file transcoder component 122-3 may transcode the media file 110 from the first compressed state to a second compressed state corresponding to a second compression technique utilizing the set of reference parameters 312 from the reference file 132. The second compression technique may comprise a lossy or lossless compression technique as desired for a given level of quality and resolution. The second compression technique may comprise, for example, an interframe compression technique such as a transform-based coding technique. A transform-based coding technique may be similar to other interframe compression techniques, such as the H.264 Standards and/or the MPEG-4 AVC Standards. As with JPEG2000, H.264 and MPEG-4 AVC may perform lossless compression on the media file 110. Unlike other interframe compression techniques constructed to operate in a spatial domain, however, a transform-based coding technique is constructed to operate exclusively in a transform domain. Transform-based coding techniques may be described in more detail with reference to FIGS. 5-7.

The file transcoder component 122-3 may output media file 110 in the second compressed state corresponding to the second compression technique in the form the media file 130. In one embodiment, the media file 130 may include a reference file 432 and/or a reference file ID 414. The reference file 432 may comprise a same reference file as the reference file 132. However, the second compression technique may necessitate creation of a new set of reference parameters 312. In this case, the file reference component 122-2 may operate in the first mode to generate a new reference file 432 with a new set of reference parameters 312 representative of the media file 130. The reference file 432 may or may not include the reference parameters 312 from the original reference file 132.

Figure 5:
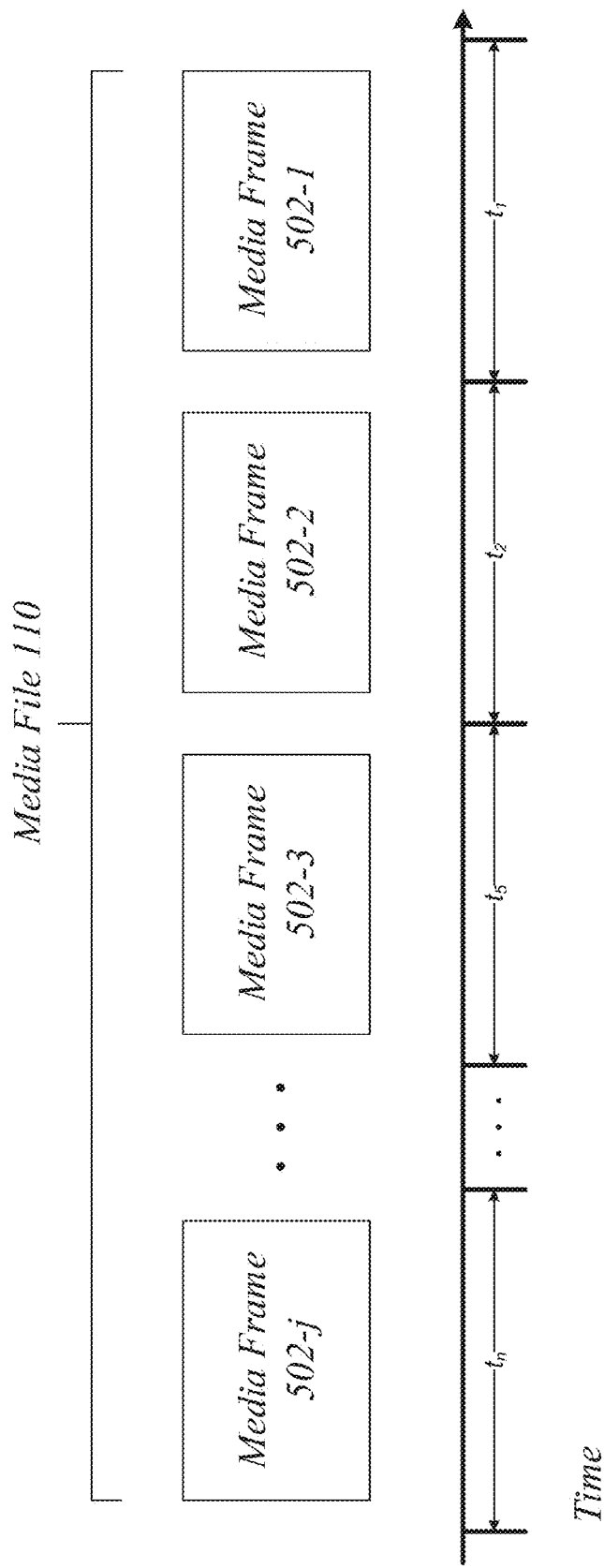
FIG. 5 illustrates an embodiment of a fourth operational environment for the apparatus.

FIG. 5 illustrates an operational environment 500. More particularly, the operational environment 500 illustrates a case where the transcoding application 120 operates in a second mode to transcode a media file 110 utilizing a transform-based encoding technique.

As previously described, the file transcoder component 122-3 may transcode a media file 110 from a first compressed state to a second compressed state utilizing a set of reference parameters 312. Transcoding operations may be performed on portions of the media file 110. A size for the portions may be a configurable parameter set by a given user, device, organization, or standard. The file transcoder component 122-3 may transcode the media file 110 using any desired level of granularity, such as a block basis, macroblock basis, frame basis, group of frames basis, and so forth. Embodiments are not limited in this context.

As shown in FIG. 5, transcoding operations may be performed on portions of the media file 110 over defined time intervals (e.g., $t_1$, $t_2$, . . . , $t_n$). The file transcoder component 122-3 may transcode each media frame 502-$j$ of the media file 110 from the first compressed state to the second compressed state using the reference parameters 312, or parameter subsets of the reference parameters 312, and a transform-based coding technique. For instance, the transform codec 124 of the file transcoder component 122-3 may process each media frame 502 in sequence, starting with media frame 502-1. The transform codec 124 may utilize interframe compression techniques to compress each media frame 502 in the transform domain.

Figure 6:
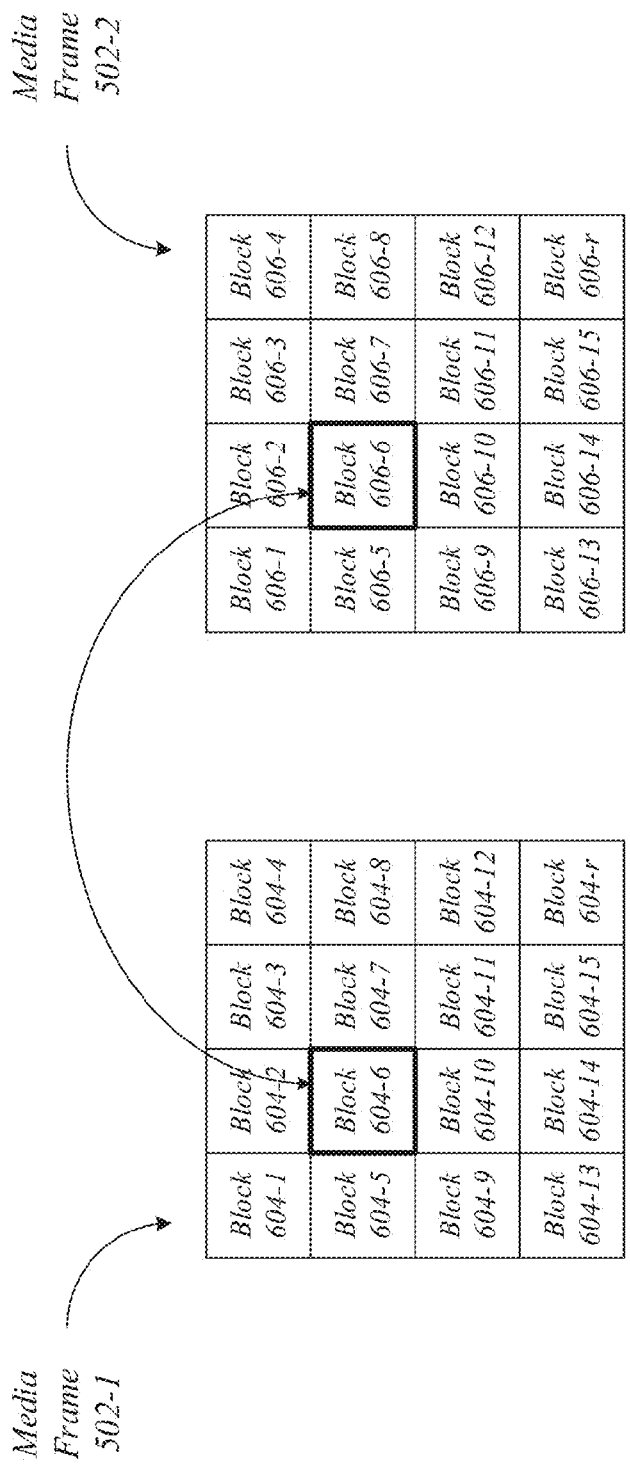
FIG. 6 illustrates an embodiment of a fifth operational environment for the apparatus.

FIG. 6 illustrates an operational environment 600. More particularly, the operational environment 600 illustrates a case where the transform codec 124 of the file transcoder component 122-3 performs interframe compression on a pair of media frames 502-1, 502-2.

Assume the transcoding application 120 receives a media file 110 as an input file. Further assume the media file 110 is a DPX file. The file handler component 122-1 may unpack the DPX file and extract a video component (or file) from the DPX file. The video component may be compressed utilizing one or more JPEG2000 Standards. The file reference component 122-2 may retrieve a set of reference parameters for the video component (e.g., GOP, frame structure, codec, etc.). The file transcode component 122-3 may then transcode the JPEG2000 file using the reference parameters and a modified form of interframe compression.

In general, interframe compression uses interframe prediction. This kind of prediction tries to take advantage from temporal redundancy between neighboring frames allowing to achieve higher compression rates. Interframe compression produces intercoded frames. An intercoded frame is divided into blocks known as macroblocks. Instead of directly encoding the raw pixel values for each block, an encoder will attempt to find a block similar to the one it is encoding on a previously encoded frame, referred to as a reference frame. This process is done by a block matching algorithm. If the encoder succeeds in its search, the block could be encoded by a vector, known as motion vector, which points to the position of the matching block at the reference frame. The process of motion vector determination is called motion estimation. In most cases the encoder will succeed, but the block found is likely not an exact match to the block it is encoding. In this case, the encoder will compute the differences between them. Those residual values are known as the prediction error and need to be transformed and sent to the decoder. If the encoder succeeds in finding a matching block on a reference frame, it will obtain a motion vector pointing to the matched block and a prediction error. Using both elements, the decoder will be able to recover the raw pixels of the block.

Referring again to FIG. 6, the transform codec 124 may utilize a transform-based coding algorithm that uses interframe compression to encode a video component of the media file 110. As shown in FIG. 5, the video component may comprise a series of media frames 502-$j$. As shown in FIG. 6, the transform codec 124 may receive a pair of media frames 502-1, 502-2, where the media frame 502-1 is received at time $t_1$ and the media frame 502-2 is received at time $t_2$. The media frames 502-1, 502-2 may each comprise a set of macroblocks. The media frame 502-1 may comprise data blocks 604-$r$. The media frame 502-2 may comprise data blocks 606-$r$. Although it is likely that the media frames 502-1, 502-2 may have a same number of blocks for uniformity, this is not necessarily true in all cases.

While encoding media frame 502-2, the transform codec 124 may utilize a transform-based coding algorithm to encode a block 606-6 of the media frame 502-2. The transform codec 124 may scan the previously received media frame 502-1 to determine whether any of the blocks 604 matches the block 606-6 of the media frame 502-2. In this case, the transform codec 124 finds a matching block 604-6. The transform codec 124 may use the matching blocks 604-6, 606-6 to perform interframe compression.

Figure 7:
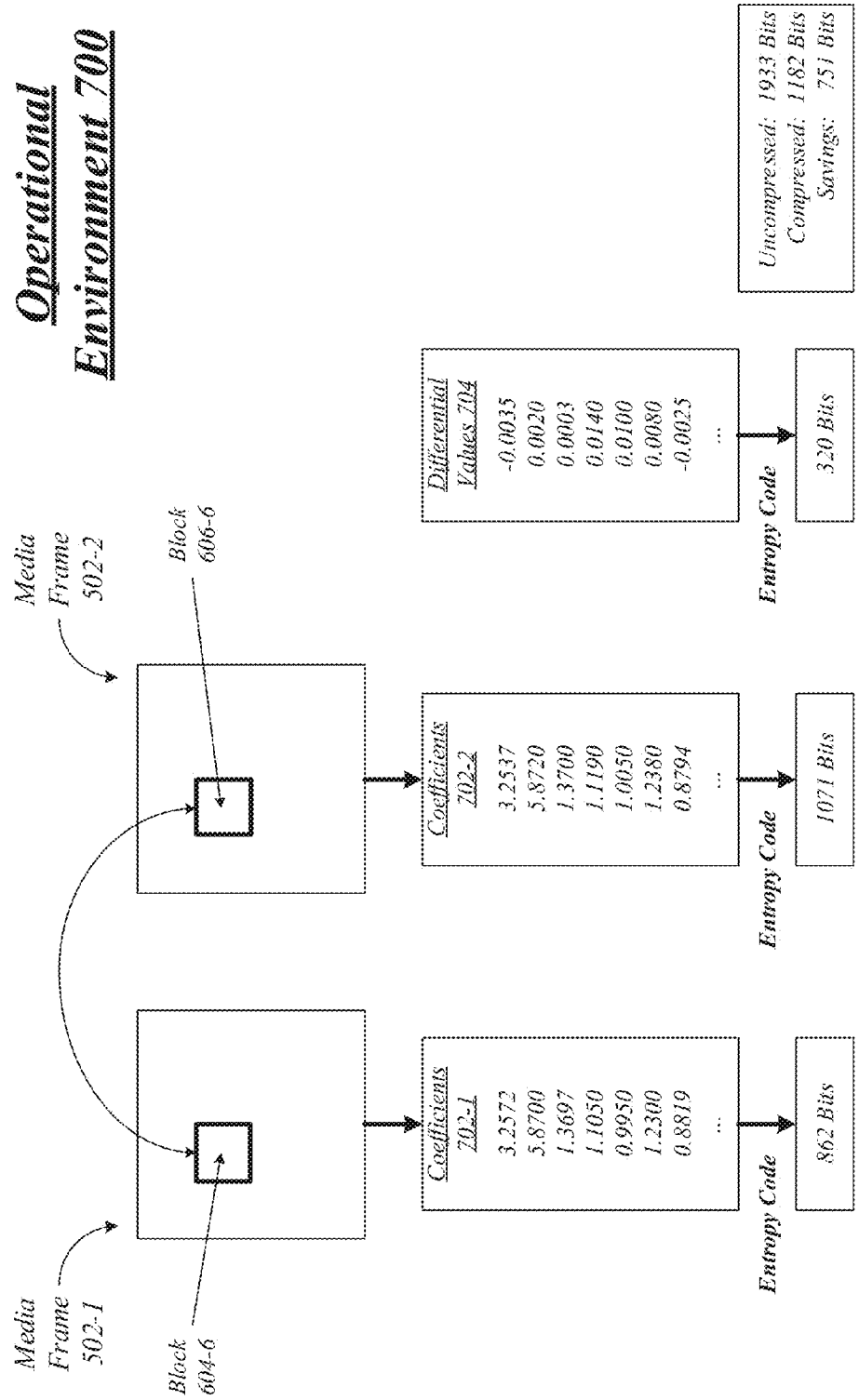
FIG. 7 illustrates an embodiment of a sixth operational environment for the apparatus.

FIG. 7 illustrates an operational environment 700. More particularly, the operational environment 700 illustrates a case where the transform codec 124 of the file transcoder component 122-3 performs interframe compression on a pair of blocks 604-6, 606-6 of media frames 502-1, 502-2, respectively. In the operational environment 700, the first data block 604-6 may comprise a reference block, and the second data block 606-6 may comprise a data block to be encoded using the reference block.

In the transform domain, the blocks 604-6, 606-6 may each comprise a set of coefficients 702-$k$ produced as a result of a wavelet transform (e.g., via JPEG2000) performed on the original pixel values comprising part of media frames 502-1, 502-2, respectively. As shown in FIG. 7, the block 604-6 of the media frame 502-1 may comprise a first set of coefficients 702-1 comprising values 3.2572, 5.8700, . . . , 0.8819. The block 606-6 of the media frame 502-2 may comprise a second set of coefficients 702-2 comprising values 3.2537, 5.8720, . . . , 0.8794. While blocks 604-6, 606-6 are shown having coefficients 702-1, 702-2, respectively, it may be appreciated that each block 604, 606 of the media frames 502-1, 502-2 would have its own set of coefficients 702.

The transform codec 124 may attempt to locate or identify a set of matching coefficients 702-1, 702-2 between the first data block 604-6 and the second data block 606-6 of the video component. As shown by the coefficient values of the first and second coefficient sets 702-1, 702-1, there is not an exact match. What determines a sufficient "match" for transform-based coding may be a configurable parameter used by the transform-based coding algorithm. When a sufficient match is found, the transform codec 124 computes a set of differential values 704 for the set of matched coefficients 702-1, 702-2. In this case, the set of differential values 704 comprise −0.0035, 0.0020, . . . , −0.0025. For instance, a first differential value −0.0035 is the difference between a first coefficient value 3.2572 and a first coefficient value 3.2537 of the set of coefficients 702-1, 702-2, respectively.

Once the set of differential values 704 are computed, the transform codec 124 may determine whether it is more efficient to encode the set of differential values 704 for the block 606-6 or the actual set of coefficients 702-2 for the block 606-6. To accomplish this, the transform codec 124 may generate a first number of bits needed to encode the set of differential values 704 and a second number of bits needed to encode the set of coefficients 702-2 for the block 606-6 utilizing a suitable compression technique. The transform codec 124 may implement, for example, any number of different compression techniques to calculate a number of encoded bits, such as entropy encoding, Huffman coding, arithmetic coding, run-length encoding (RLE), variable length coding, and so forth. Embodiments are not limited in this context.

In the example shown in FIG. 7, the differential values 704 may be entropy encoded to produce a first number of bits in an amount of 320 bits. Similarly, the set of coefficients 702-2 may be entropy encoded to produce a second number of bits in an amount of 1071 bits.

The transform coded 124 may compare the first number of bits needed to encode the set of differential values 704, and the second number of bits needed to encode the set of coefficients 702-2 of the data block 606-6 of the video component, and select which to encode based on comparison results. For instance, the transform codec 124 may encode the first data block 606-6 with the set of differential values 704 when the first number of bits is lower than the second number of bits. In this case, the first number of bits is 320 bits, which is lower than the second number of bits which is 1071 bits. As such the transform coded 124 encodes the set of differential values 704. However, if the first number of bits were higher than the second number of bits, the transform codec 124 would encode the set of coefficients 702-2 of the data block 606-6 directly without using the set of differential values 704, as it would result in using a fewer number of bits. In this manner, the transform codec 124 may efficiently encode each block of each media frame.

In some cases, a media file 110 may not be immediately suitable for transform-based coding. For instance, a media file 110 may have coefficients 702 that have been already compressed using some form of entropy encoding. In such cases, the transform codec 124 may need to reverse the entropy encoding to retrieve an original set of coefficients 702 for use in transform-based coding.

Once the video component of the media file 110 is compressed utilizing the transform-based coding algorithm, the file handler component 122-1 may combine the compressed video component with other media (e.g., an audio component). In addition, the file reference component 122-2 may update the reference file 132 with new or modified reference parameters 312 to form reference file 432 as described with reference to FIG. 4. The file handler component 122-1 may then output a media file 130 in the DPX file format.

Although FIG. 7 is described with respect to encoding operations performed by the transform codec 124, it may be appreciated that decoding operations may be performed by the transform codec 124 as well in a similar manner. For instance, the decoding operations may minor or reverse the encoding operations.

Although media frames 502-1, 502-2 are shown as a single plane for purposes of clarity, every media frame 502 of the media file 110 actually comprises multiple planes, each plane comprising a different brightness or color plane. For instance, a media frame 502 typically has three planes, comprising a luminance plane (Y), a red chrominance difference plane (Cr) and a blue chrominance difference plane (Cb). In such cases, the transform codec 124 may compress each plane independently using transform-based coding.

It is worthy to note that although FIG. 7 illustrates only two media frames 502-1, 502-2, where the second media frame 502-2 gets the benefit of using the adjacent first media frame 502-1 as a predictor, this is not the case in all implementations. Transform-based coding may be extended to many frames, where any preceding frame can be used as the predictor. FIG. 7 illustrates a simple case where the immediately preceding frame is used, but this is usually not optimal. It is better to describe, in metadata, which preceding frame is used to predict each block of the image.

Besides designating which preceding frame to use to predict a particular block, many other types of metadata can be incorporated into the media file 110 as a reference parameter 312. For instance, metadata may be used to describe whether to use any prediction at all, which entropy coding parameters to use, and other useful parameters. This metadata may also be entropy coded, since there is a high correlation of these values between adjacent blocks.

While it may be highly valuable to have the output from the decoded stream be bit-for-bit equivalent to the input stream to the transform coder 124, the transform coder 124 could also allow selective degradation of the images to make the entire stream smaller. This might yield significant storage savings at a relatively low cost. A trade-off may be calculated between a desired level of image quality versus transport or storage savings to arrive at an optimal level of lossiness for a given media file 110.

As previously discussed, the transform codec 124 may use different compression techniques, such as entropy coding, to achieve a desired level of compression. In some cases, the transform codec 124 may be configured to perform a particular type of compression (e.g., entropy encoding) of the transform coefficients 702 based on a given standard (e.g., JPEG2000). However, the entropy coding of the differences in transform coefficients between a reference frame and a derived frame can be anything that yields a desired level of results. In other words, the transform codec 124 is not necessarily constrained to use the same entropy coding scheme for the differential values 704 as was used for the original image 502-2.

Figure 8:
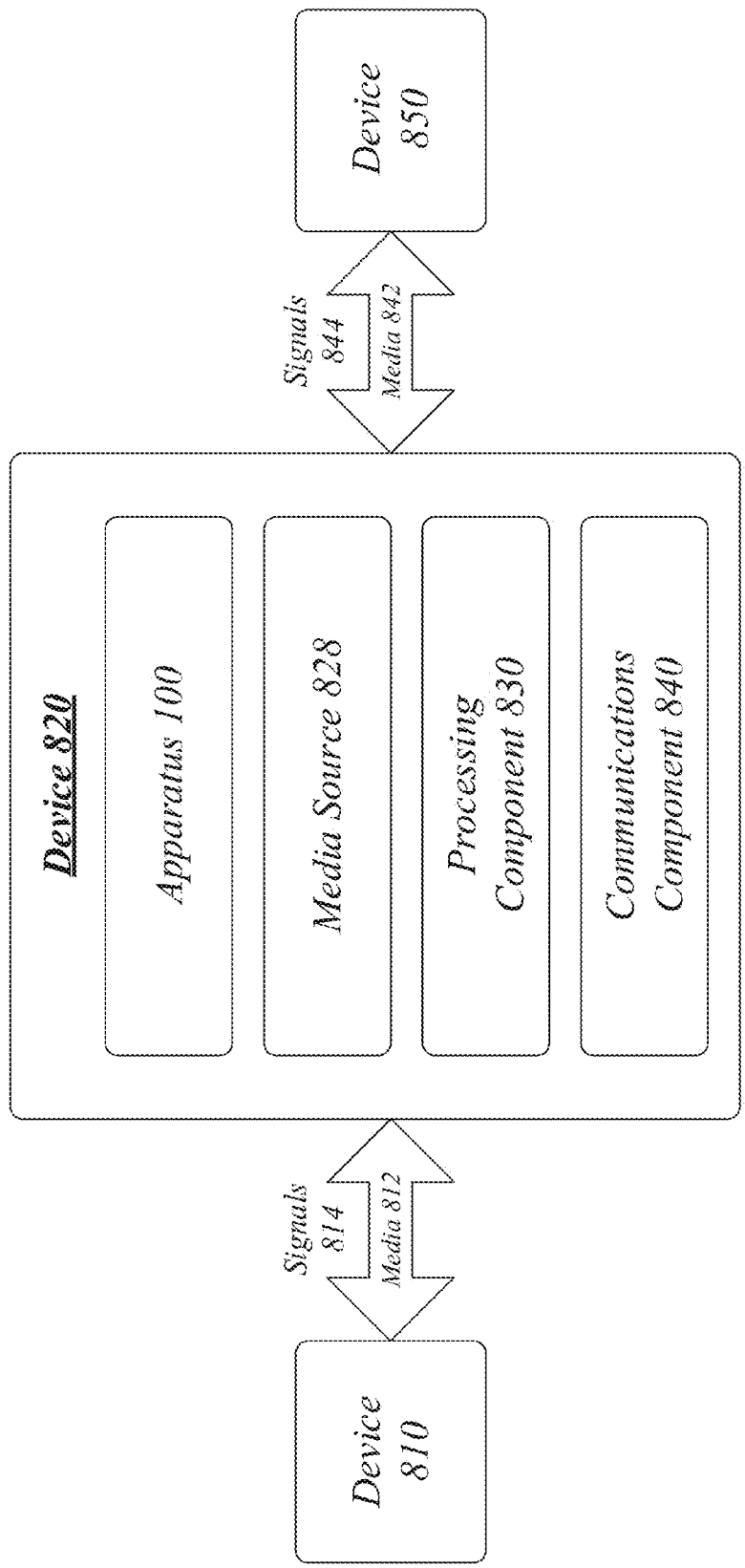
FIG. 8 illustrates an embodiment of a centralized system for the apparatus.

FIG. 8 illustrates a block diagram of a centralized system 800. The centralized system 800 may implement some or all of the structure and/or operations for the apparatus 100 in a single computing entity, such as entirely within a single device 820.

The device 820 may comprise any electronic device capable of receiving, processing, and sending information for the apparatus 100. Examples of an electronic device may include without limitation a computer, a server, a server array or server farm, a web server, a network server, an Internet server, a storage server, a work station, a minicomputer, a main frame computer, a supercomputer, a network appliance, a web appliance, a distributed computing system, multiprocessor systems, processor-based systems, a machine, or combination thereof. The embodiments are not limited in this context.

The device 820 may execute processing operations or logic for the apparatus 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 820 may execute communications operations or logic for the apparatus 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812, 842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 820 may communicate with other devices 810, 850 over a communications media 812, 842, respectively, using communications signals 814, 844, respectively, via the communications component 840. The devices 810, 850 may be internal or external to the device 820 as desired for a given implementation.

In one embodiment, the apparatus 100 in general, and the transcoding application 120 in particular, may be implemented as part of a storage server for nonvolatile mass storage facility, such as a SAN or NAS. The transcoding application 120 may be implemented for each storage server in the SAN or NAS, or may be a shared resource for multiple storage servers in the SAN or NAS. In the latter case, the transcoding application 120 may be part of a management server or network appliance. Embodiments are not limited in this context.

Figure 9:
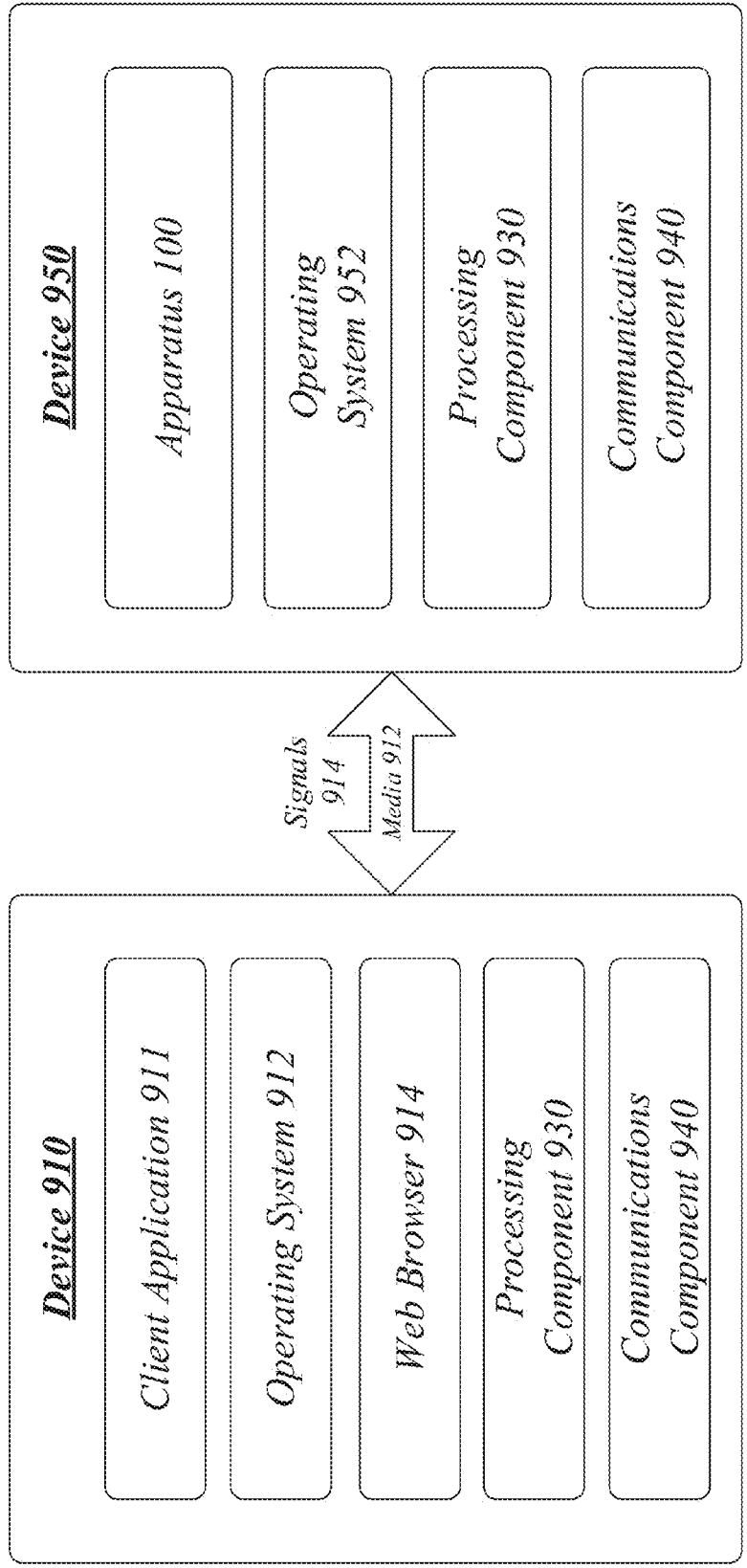
FIG. 9 illustrates an embodiment of a distributed system for the apparatus.

FIG. 9 illustrates a block diagram of a distributed system 900. The distributed system 900 may distribute portions of the structure and/or operations for the apparatus 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise devices 910, 950. In general, the devices 910, 950 may be the same or similar to the device 820 as described with reference to FIG. 8. For instance, the devices 910, 950 may each comprise a processing component 930 and a communications component 940 which are the same or similar to the processing component 830 and the communications component 840, respectively, as described with reference to FIG. 8. In another example, the devices 910, 950 may communicate over a communications media 912 using communications signals 914 via the communications components 940.

The device 950 may comprise or employ one or more server programs that operate to perform various methodologies in accordance with the described embodiments. In one embodiment, for example, the device 950 may implement the transcoding application 120. The transcoding application 120 may be considered a server program in that is services requests from the device 910. For instance, the device 910 may comprise another server device that requests transcoding services from the The device 910 may comprise or employ one or more client programs or server programs that operate to perform various methodologies in accordance with the described embodiments. In one embodiment, for example, the device 910 may implement a client application 911. The client application 911 may be considered a client program in that it requests services from the transcoding application 120. For instance, a user may utilize the client application 911 to request transcoding services from the device 950 for media files 110 under its control.

Device 910 may further comprise a web browser 914. The web browser 914 may be used in lieu of the client application 911 to access the server-based transcoding application 120. The web browser 914 may comprise any commercial web browser. The web browser 914 may be a conventional hypertext viewing application such as MICROSOFT INTERNET EXPLORER®, APPLE® SAFARI®, FIREFOX® MOZILLA®, GOOGLE® CHROME®, OPERA®, and other commercially available web browsers. Secure web browsing may be supplied with 128-bit (or greater) encryption by way of hypertext transfer protocol secure (HTTPS), secure sockets layer (SSL), transport security layer (TSL), and other security techniques. Web browser 914 may allow for the execution of program components through facilities such as ActiveX, AJAX, (D)HTML, FLASH, Java, JavaScript, web browser plug-in APIs (e.g., FireFox, Safari Plug-in, and the like APIs), and the like. The web browser 914 may communicate to and with other components in a component collection, including itself, and facilities of the like. Most frequently, the web browser 914 communicates with information servers (e.g., server devices 820, 850), operating systems, integrated program components (e.g., plug-ins), and the like. For example, the web browser 914 may contain, communicate, generate, obtain, and provide program component, system, user, and data communications, requests, and responses. Of course, in place of the web browser 914 and information server, a combined application may be developed to perform similar functions of both.

A human operator such as a network administrator may utilize the web browser 914 to access applications and services provided by the device 950. For instance, the web browser 914 may be used to configure transcoding operations performed by the transcoding application 120 on the device 950. The web browser 914 may also be used to access cloud-based applications and services, such as online storage applications, services and tools.

In addition to the client application 911, the device 910 may be another device with a SAN or NAS. For instance, when the transcoding application 120 is a shared resource, the device 910 may comprise another storage server within the SAN or NAS. Embodiments are not limited in this context.

Figure 10:
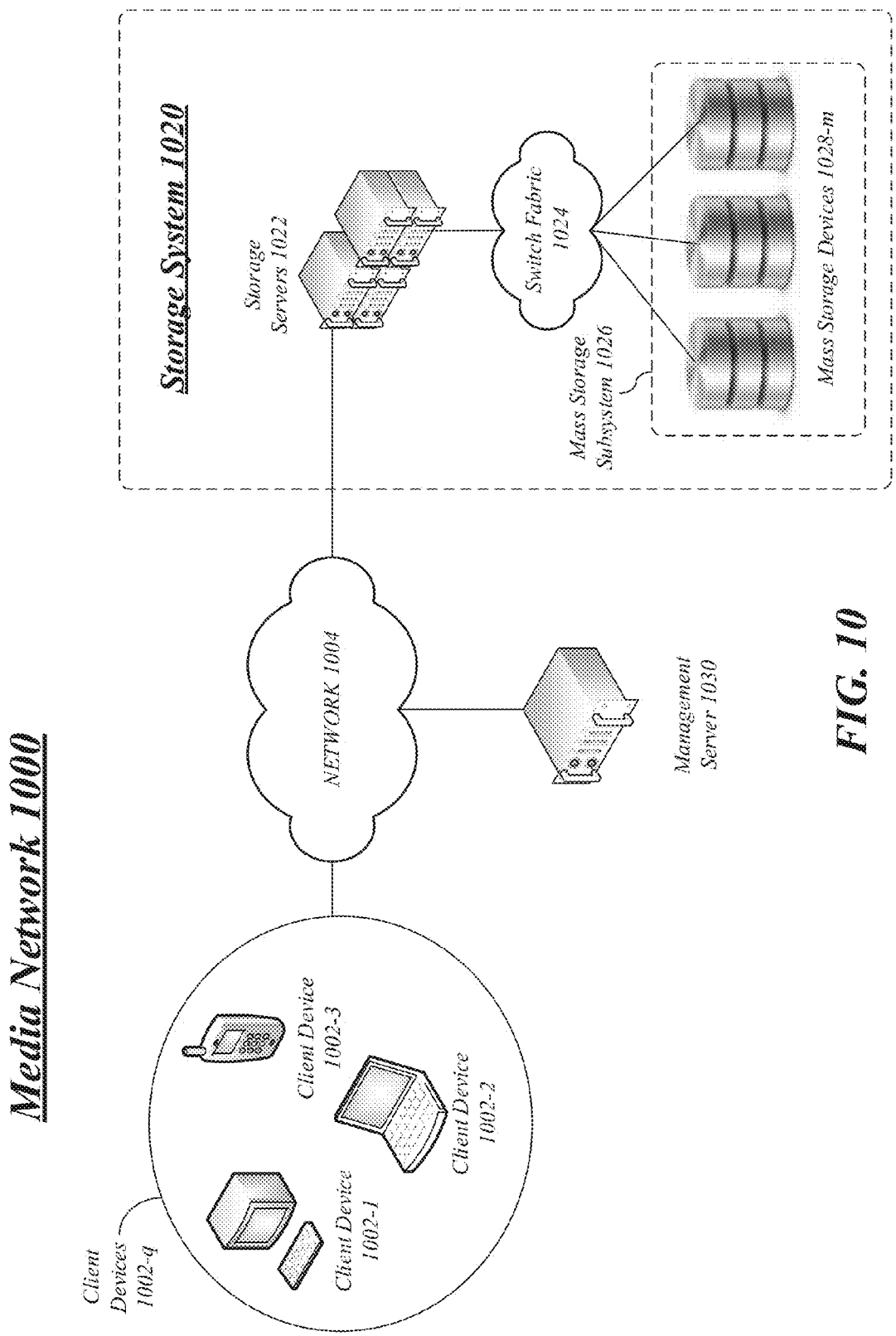
FIG. 10 illustrates an embodiment of a storage network.

FIG. 10 illustrates an embodiment of a storage network 1000. The storage network 1200 provides a network level example of an environment suitable for use with the apparatus 100.

In the illustrated embodiment shown in FIG. 10, a set of client devices (or systems) 1002-$q$ may comprise client devices 1002-1, 1002-2 and 1002-3. The client devices 1002-$q$ may comprise representative examples of a class of devices a user may utilize to access online storage services. As shown in FIG. 10, each client device 1002-$q$ may represent a different electronic device a user can utilize to access a web services and web applications provided by a network management server 1012. For instance, the client device 1002-1 may comprise a desktop computer, the client device 1002-2 may comprise a notebook computer, and the client device 1002-3 may comprise a smart phone. It may be appreciated that these are merely a few examples of client devices 1002-$q$, and any electronic device may be implemented as a client device 1002-$q$ (e.g., a smart phone, a tablet computer, a notebook computer, etc.). The embodiments are not limited in this context.

A user may utilize a client device 1002-$q$ to access a storage center 1020. The storage center 1020 may comprise a cloud computing storage center or a private storage center. Each type of storage center may be similar in terms of hardware, software and network services. Differences between the two may include geography and business entity type. A cloud computing storage center is physically located on premises of a specific business entity (e.g., a vendor) that produces online storage services meant for consumption by another business entity (e.g., a customer). A private storage center is physically located on premises of a specific business entity that both produces and consumes online storage services. A private storage center implementation may be desirable, for example, when a business entity desires to control physical security to equipment used to implement the private storage center.

A cloud computing storage center may utilize various cloud computing techniques to store data, such as media files 110, 130, for a user of a client device 1002-$q$. Cloud computing is the use of computing resources (hardware and software) which are available in a remote location and accessible over a network (e.g., the Internet). A user may access cloud-based applications through a web browser or a light-weight desktop or mobile application while business software and user data are stored on servers at a remote location. An example of a cloud computing storage center 1010 may include a Citrix CloudPlatform® made by Citrix Systems, Inc.

The storage system 1020 is an example of a network data storage environment, which includes a plurality of client devices 1002-$q$ coupled to a storage system 1020 via a network 1004. As shown in FIG. 10, the storage system 1020 includes at least one storage server 1022, a switching fabric 1024, and a number of mass storage devices 1028-$m$, such as nonvolatile mass storage disks, in a mass storage subsystem 1026. Alternatively, some or all of the mass storage devices 1028 can be other types of storage, such as flash memory, optical, solid-state drives (SSDs), tape storage, etc.

The storage server 1022 may be, for example, one of the FAS-xxx family of storage server products available from NetApp®, Inc. The client devices 1002 are connected to the storage server 1022 via the computer network 1004, which can be a packet-switched network, for example, a local area network (LAN) or wide area network (WAN). Further, the storage server 1022 is connected to the mass storage devices 1028 via a switching fabric 1024, which can be a fiber distributed data interface (FDDI) network, for example. It is noted that, within the network data storage environment, any other suitable numbers of storage servers and/or mass storage devices, and/or any other suitable network technologies, may be employed.

The storage server 1022 can make some or all of the storage space on the mass storage devices 1028 available to the client devices 1002 in a conventional manner. For example, each of the mass storage devices 1028 can be implemented as an individual disk, multiple disks (e.g., a RAID group) or any other suitable mass storage device(s). The storage server 1022 can communicate with the client devices 1002 according to well-known protocols, such as the Network File System (NFS) protocol or the Common Internet File System (CIFS) protocol, to make data stored on the mass storage devices 1028 available to users and/or application programs. The storage server 1022 can present or export data stored on the mass storage devices 1028 as volumes to each of the client devices 1002. A "volume" is an abstraction of physical storage, combining one or more physical mass storage devices (e.g., disks) or parts thereof into a single logical storage object (the volume), and which is managed as a single administrative unit, such as a single file system. A "file system" is a structured (e.g., hierarchical) set of stored logical containers of data (e.g., volumes, logical unit numbers (LUNs), directories, files). Note that a "file system" does not have to include or be based on "files" per se as its units of data storage. For instance, a file system may use object or block levels of atomic data units.

Various functions and configuration settings of the storage server 1022 and the mass storage subsystem 1026 can be controlled from a management server 1030 coupled to the network 1004. Among many other operations, transcoding operations can be initiated from the management station 1030 for media files 110, 130 stored in the mass storage devices 1028 of the mass storage subsystem 1026. Alternatively, transcoding operations can be initiated from the storage server 1022, or from the mass storage subsystem 1026. Embodiments are not limited in this context.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 11:
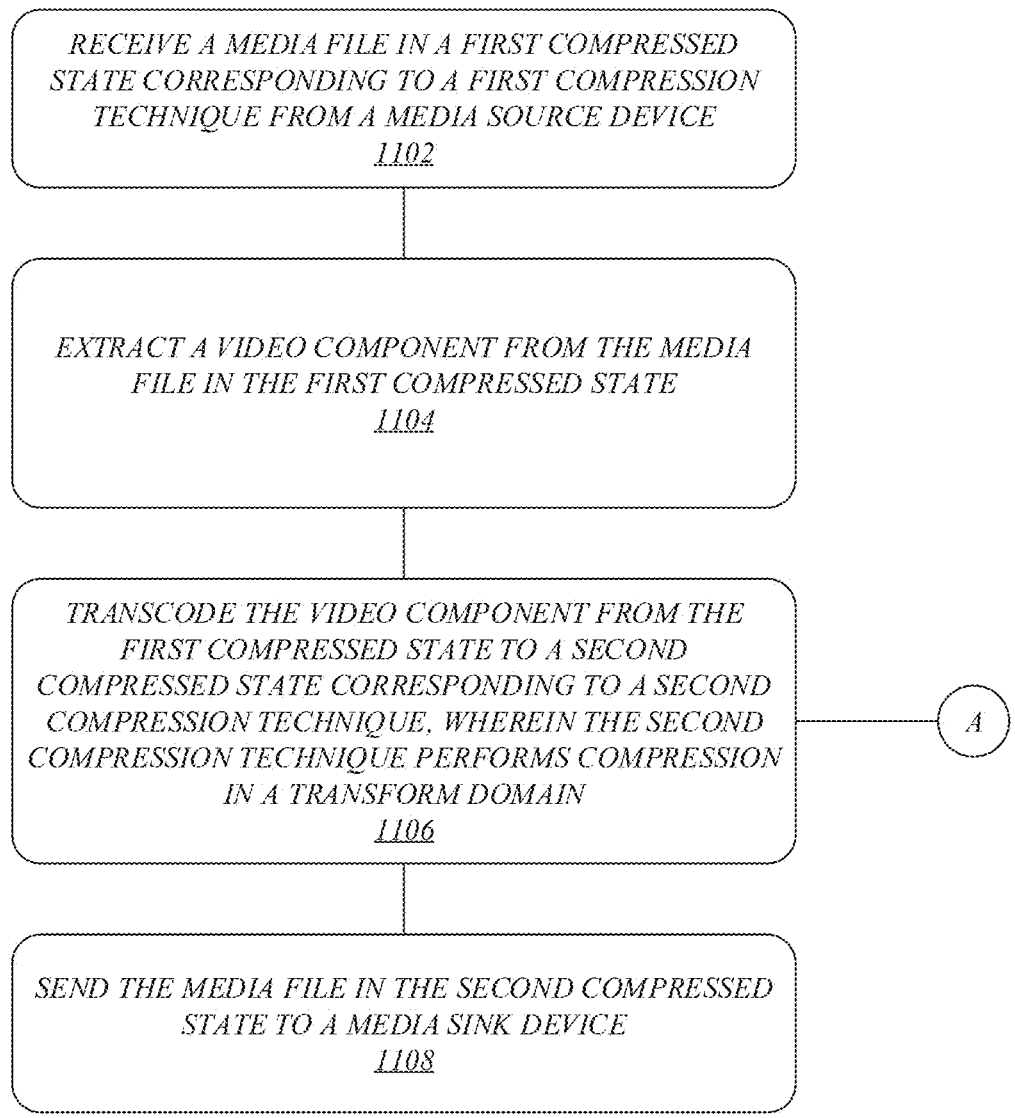
FIG. 11 illustrates an embodiment of a first logic flow.

FIG. 11 illustrates one embodiment of a logic flow 1100. The logic flow 1100 may be representative of some or all of the operations executed by one or more embodiments described herein. For instance, the logic flow 1100 may represent operations executed by the transcoding application 120 of the apparatus 100.

In the illustrated embodiment shown in FIG. 11, the logic flow 1100 may receive a media file in a first compressed state corresponding to a first compression technique from a media source device at block 1102. For example, the file handler component 122-1 may receive a media file 110 in a first compressed state corresponding to a first compression technique from a media source device 502. The media source device 502 may comprise a server for a network, a server for a cable system such as Time Warner Cable®, a server for a private datacenter of an entertainment studio such as Universal Studios® or the Walt Disney Company®, a server for a public network such as YouTube® owned by Google®, and so forth. The first compression technique may comprise an intraframe compression technique, such as JPEG2000, for instance.

At block 1102, the logic flow 1100 may optionally retrieve a reference file with a set of reference parameters associated with the media file. For example, the file reference component 122-2 may retrieve a reference file 132 with a set of reference parameters 312 associated with the media file 132. The reference file 132 may be embedded within the media file 110 or stored in a separate location, such as the reference database 140, for example.

The logic flow 1100 may extract a video component from the media file in the first compressed state at block 1104. For instance, the file handler component 122-1 may extract a video component from other media components (e.g., an audio component) and/or metadata in the media file 110. The video component may be extracted in the first compressed state, such as a JPEG2000 compressed file.

The logic flow 1100 may transcode the video component of the media file from the first compressed state to a second compressed state corresponding to a second compression technique, wherein the second compression technique performs compression in a transform domain, at block 1106. For example, the transform codec 124 of the file transcoder component 122-3 may transcode a video component of the media file 110 from the first compressed state to the second compressed state corresponding to a second compression technique utilizing a transform-based coding algorithm to form a media file 130. The transform codec 124 may optionally use the set of reference parameters 312 to form the media file 130. The second compression technique may use a modified form of interframe compression, such as a modified form of interframe compression as defined by one of the H.264 Standards or MPEG-4 ADV Standards, among others.

The logic flow 1100 may send the media file in the second compressed state to a media sink device at block 1108. For instance, the file handler component 122-1 may send the media file 130 in the second compressed state to a media sink device 504. The media sink device 504 may comprise another server 910, 950, or a client device 1002, for example.

FIG. 12 illustrates one embodiment of a logic flow 1200. The logic flow 1200 may be representative of some or all of the operations executed by one or more embodiments described herein. For instance, the logic flow 1200 may represent an exemplary implementation for the transform codec 124 of the file transcoder component 122-3 of the transcoding application 120.

In the illustrated embodiment shown in FIG. 12, the logic flow 1200 may identify a set of matching coefficients between a first data block and a second data block of the video component at block 1202. For example, the transform codec 124 may scan various blocks of a reference frame such as a previously received media frame 502-1 to find a matching block of a current frame to be encoded such as subsequently received media frame 502-2. As previously described with reference to FIG. 7, the transform codec 124 may identify a set of matching coefficients 702-1, 702-2 between blocks 604-6, 606-6, respectively, of the media frames 502-1, 502-2, respectively, of the video component.

The logic flow 1200 may compute a set of differential values for a set of matched coefficients between a first data block and a second data block of the video component, the first data block comprising a reference block and the second data block comprising a data block to be encoded, at block 1204. For instance, when a matching set of coefficients 702-1, 702-2 are found, the transform codec 124 may compute a set of differential values 704 for the set of matched coefficients 702-1, 702-2 between blocks 604-6, 606-6, respectively, of the video component. In this case, the first data block 604-6 may comprise a reference block and the second data block 606-6 may comprise a data block to be encoded by the transform codec 124.

The logic flow 1200 may compare a first number of bits needed to encode a set of differential values for a set of matched coefficients between a first data block and a second data block of the video component and a second number of bits needed to encode the second data block of the video component at block 1206. For instance, the transform codec 124 may compare a first number of bits needed to encode a set of differential values 704 for a set of matched coefficients 702-1, 702-2 with a second number of bits needed to encode the set of coefficients 702-2 for the block 606-6 of the video component. The transform codec 124 may determine which to encode based on comparison results, as described in more detail with reference to FIG. 13.

Figure 13:
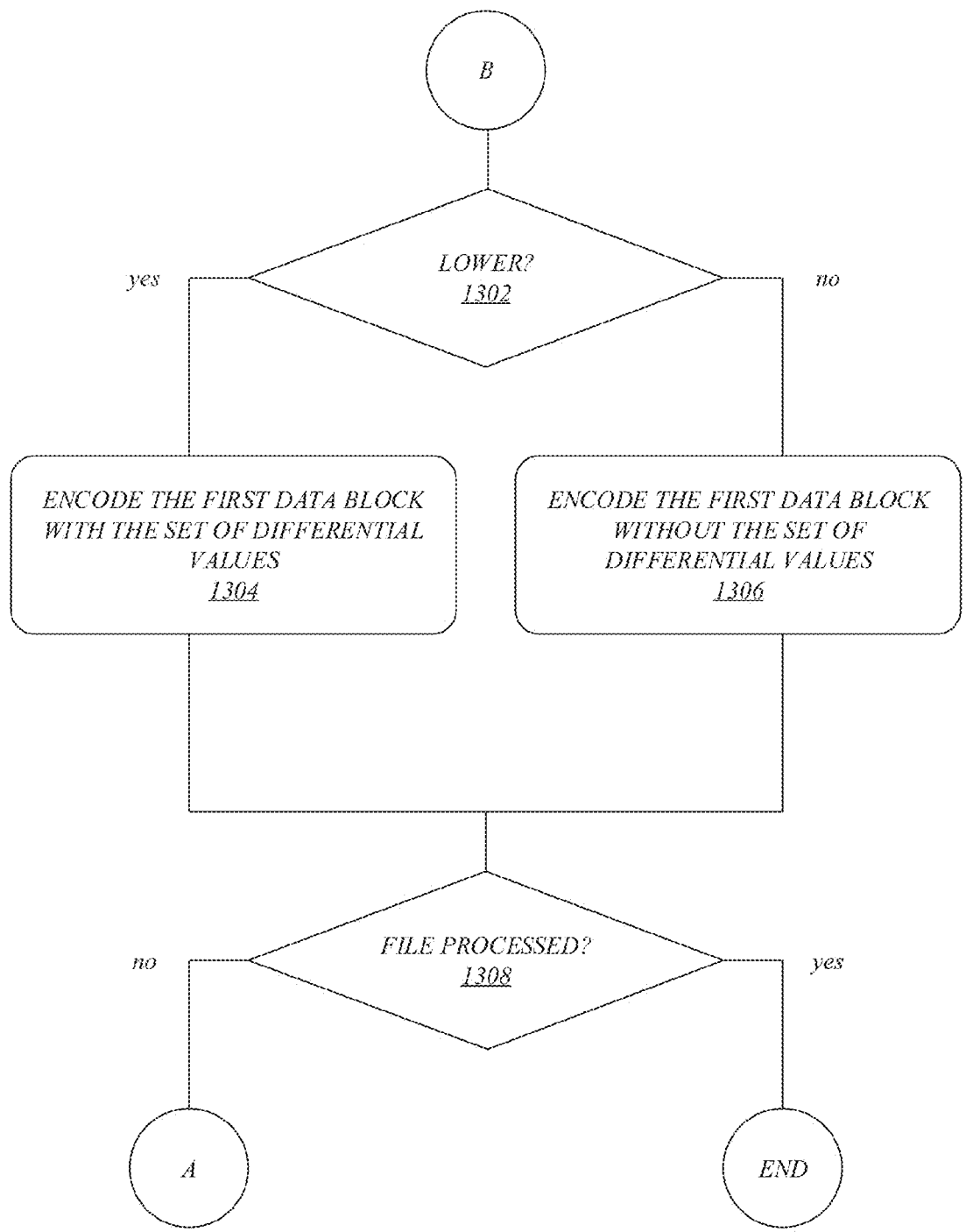
FIG. 13 illustrates an embodiment of a third logic flow.

FIG. 13 illustrates one embodiment of a logic flow 1300. The logic flow 1300 may be representative of some or all of the operations executed by one or more embodiments described herein. For instance, the logic flow 1300 may represent an exemplary implementation for the transform codec 124 of the file transcoder component 122-3 of the transcoding application 120 when making an encoding decision.

In the illustrated embodiment shown in FIG. 13, the logic flow 1300 may compare a first number of bits needed to encode a set of differential values for a set of matched coefficients between a first data block and a second data block of the video component and a second number of bits needed to encode the second data block of the video component to determine which is lower at diamond 1302.

The logic flow 1300 may determine to encode the second data block with the set of differential values when the first number of bits is lower than the second number of bits at block 1304. For instance, in the previous example described with reference to FIG. 7, the first number of bits was 320 bits and the second number of bits was 1071 bits. Since the first number of bits is lower than the second number of bits, the transform codec 124 may encode the differential values 704 of the block 606-6 rather than the actual set of coefficients 702-2 for the block 606-6, as it is more efficient.

The logic flow 1300 may determine to encode the second data block without the set of differential values when the first number of bits is higher than the second number of bits at block 1306. For instance, assume the first number of bits was 1000 bits and the second number of bits was 800 bits. Since the first number of bits is higher than the second number of bits, the transform codec 124 may encode the actual set of coefficients 702-2 for the block 606-6 rather than the differential values 704 of the block 606-6, as it is more efficient.

The logic flow 1300 may determine whether all macroblocks of all media frames 502 of the media file 110 have been processed at diamond 1308. If not, control is passed to logic flow 1200 to continue processing the next macroblock, otherwise the logic flow 1300 terminates.

Figure 14:
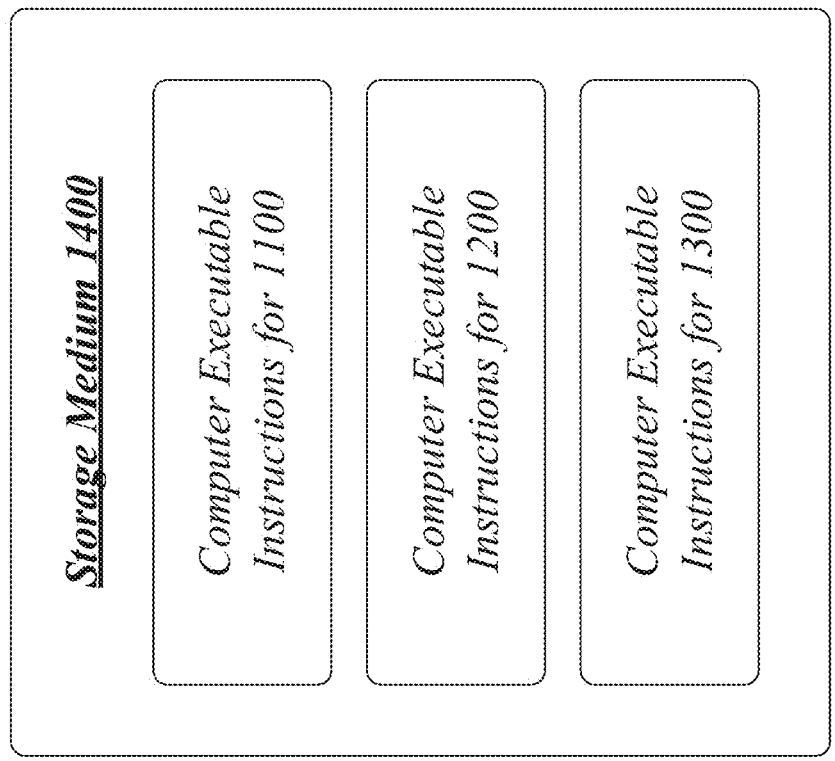
FIG. 14 illustrates an embodiment of a storage medium.

FIG. 14 illustrates an embodiment of a storage medium 1400. The storage medium 1400 may comprise an article of manufacture. In one embodiment, the storage medium 1400 may comprise any non-transitory computer readable medium or machine readable medium, such as an optical, magnetic or semiconductor storage. The storage medium may store various types of computer executable instructions, such as instructions to implement one or more of the logic flows 1100, 1200 and/or 1300. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 15:
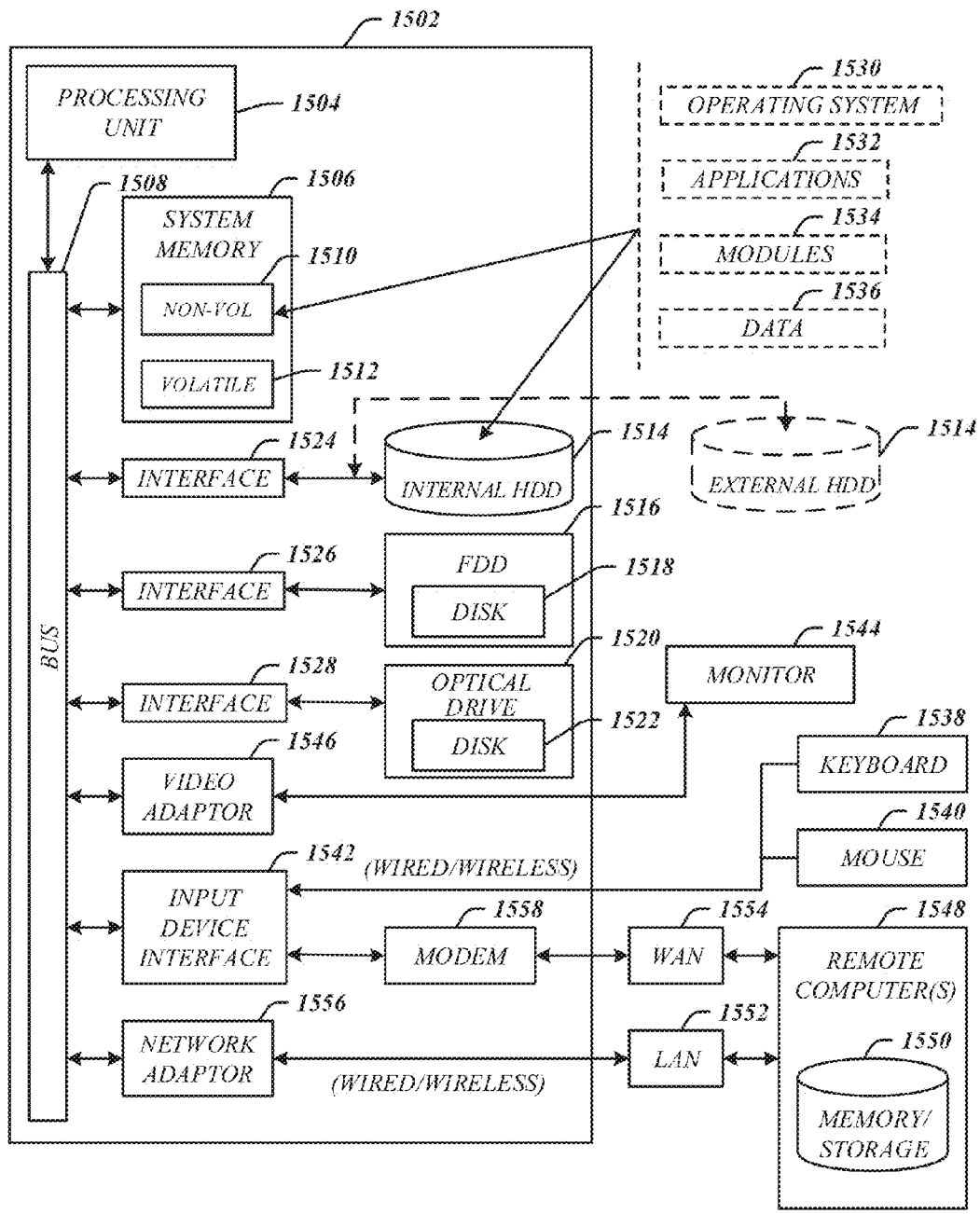
FIG. 15 illustrates an embodiment of a computing architecture.

FIG. 15 illustrates an embodiment of an exemplary computing architecture 1500 suitable for implementing various embodiments as previously described. In one embodiment, the computing architecture 1500 may comprise or be implemented as part of an electronic device. Examples of an electronic device may include those described with reference to FIGS. 8-10, among others. The computing architecture 1500 may be used, for example, to implement apparatus 100. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1500.

As shown in FIG. 15, the computing architecture 1500 comprises a processing unit 1504, a system memory 1506 and a system bus 1508. The processing unit 1504 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1504.

The system bus 1508 provides an interface for system components including, but not limited to, the system memory 1506 to the processing unit 1504. The system bus 1508 can be any of several types of bus structure that may further interconnect to a memory bus (with or without a memory controller), a peripheral bus, and a local bus using any of a variety of commercially available bus architectures. Interface adapters may connect to the system bus 1508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 15, the system memory 1506 can include non-volatile memory 1510 and/or volatile memory 1512. A basic input/output system (BIOS) can be stored in the non-volatile memory 1510.

The computer 1502 may include various types of computer-readable storage media in the form of one or more lower speed memory units, including an internal (or external) hard disk drive (HDD) 1514, a magnetic floppy disk drive (FDD) 1516 to read from or write to a removable magnetic disk 1518, and an optical disk drive 1520 to read from or write to a removable optical disk 1522 (e.g., a CD-ROM or DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536. In one embodiment, the one or more application programs 1532, other program modules 1534, and program data 1536 can include, for example, the various applications and/or components of the apparatus 100.

A user can enter commands and information into the computer 1502 through one or more wire/wireless input devices, for example, a keyboard 1538 and a pointing device, such as a mouse 1540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1504 through an input device interface 1542 that is coupled to the system bus 1508, but can be connected by other interfaces such as a parallel port, IEEE 1394 serial port, a game port, a USB port, an IR interface, and so forth.

A monitor 1544 or other type of display device is also connected to the system bus 1508 via an interface, such as a video adaptor 1546. The monitor 1544 may be internal or external to the computer 1502. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.15 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.15x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 16:
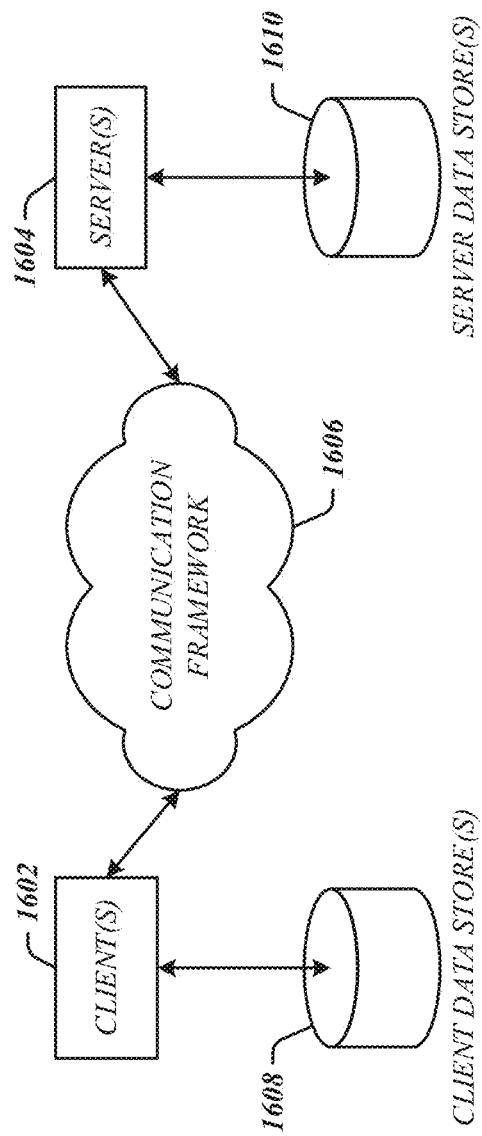
FIG. 16 illustrates an embodiment of a communications architecture.

FIG. 16 illustrates a block diagram of an exemplary communications architecture 1600 suitable for implementing various embodiments as previously described. The communications architecture 1600 includes various common communications elements, such as a transmitter, receiver, transceiver, radio, network interface, baseband processor, antenna, amplifiers, filters, power supplies, and so forth. The embodiments, however, are not limited to implementation by the communications architecture 1600.

As shown in FIG. 16, the communications architecture 1600 comprises includes one or more clients 1602 and servers 1204. The clients 1602 may implement the device 910. The servers 1204 may implement the device 950. The clients 1602 and the servers 1204 are operatively connected to one or more respective client data stores 1608 and server data stores 1610 that can be employed to store information local to the respective clients 1602 and servers 1204, such as cookies and/or associated contextual information.

The clients 1602 and the servers 1204 may communicate information between each other using a communication framework 1606. The communications framework 1606 may implement any well-known communications techniques and protocols. The communications framework 1606 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1606 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1602 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Further examples are provided as follows.

The invention claimed is:
1. An apparatus, comprising:
a processor circuit; and
a non-transitory machine-readable medium comprising program code for a transcoding application executable by the processor circuit to cause the apparatus to,
transcode frames of a media file from a first compressed state corresponding to a non-interframe compression technique to a second compressed state corresponding to an inter-frame compression technique in a transform domain,
wherein the program code to transcode the frames of the media file to the second compressed state comprises program code for a transform encoder to encode the frames of the media file according to the inter-frame compression technique, wherein the transform encoder program code to encode the frames of the media file according to the inter-frame compression technique comprises program code executable by the processor circuit to cause the apparatus to,
identify a first set of coefficients of a first block of a first frame in the first compressed state and a second set of coefficients of a second block of a second frame in the first compressed state, the identification based on a matching parameter;
compute a set of differential values between the first set of coefficients and the second set of coefficients;
determine a first number of bits of the set of differential values if entropy encoded;
determine a second number of bits of the second set of coefficients if entropy encoded;
compare the first number of bits and the second number of bits to determine which is less;
entropy encode the set of differential values if the first number of bits is less than the second number of bits; and
entropy encode the second set of coefficients if the second number of bits is less than the first number of bits.

2. The apparatus of claim 1, wherein the program code of the transcoding application comprises program code to extract the frames from the media file.

3. The apparatus of claim 1, wherein the program code for the transcoding application comprises program code to retrieve a set of reference parameters associated with the media file.

4. The apparatus of claim 3, wherein the program code to transcode the frames of the media file from the first compressed state to the second compressed state comprises program code to utilize the set of reference parameters.

5. The apparatus of claim 4, wherein the set of reference parameters comprise indication of the first frame as a reference frame for the second frame.

6. A computer-implemented method, comprising:
transcoding frames of a media file from a first compressed state to a second compressed state, wherein the first compressed state corresponds to a non-interframe compression technique and the second compressed state corresponds to an inter-frame compression technique in a transform domain;
wherein transcoding the frames of the media file comprises encoding the frames of the media file according to the inter-frame compression technique, wherein encoding the frames of the media file according to the inter-frame compression technique comprises,
identifying a first set of coefficients of a first block of a first frame in the first compressed state and a second set of coefficients of a second block of a second frame in the first compressed state, wherein the identifying is based on a matching parameter;

computing a set of differential values between the first set of coefficients and the second set of coefficients;

determining a first number of bits of the set of differential values if entropy encoded;

determining a second number of bits of the second set of coefficients if entropy encoded;

comparing the first number of bits and the second number of bits to determine which is less;

entropy encoding the set of differential values if the first number of bits is less than the second number of bits; and entropy encoding the second set of coefficients if the second number of bits is less than the first number of bits.

7. The computer-implemented method of claim 6 further comprising extracting the frames from the media file.

8. The computer-implemented method of claim 6 further comprising retrieving from storage reference parameters of the media file, wherein the transcoding is based on the reference parameters.

9. The computer-implemented method of claim 8, wherein the reference parameters comprise a parameter that indicates the first frame as a reference frame for the second frame.

10. At least one non-transitory computer-readable storage medium comprising instructions for media file transcoding, the instructions executable to:

transcode frames of a media file from a first compressed state to a second compressed state, the first compressed state corresponding to a non-interframe compression technique and the second compressed state corresponding to an inter-frame compression technique in a transform domain;

wherein the instructions to transcode frames of the media file from the first compressed state to the second compressed state comprise instructions to encode the frames of the media file according to the inter-frame compression technique, wherein the instructions to encode the frames of the media file according to the inter-frame compression technique comprise instructions executable to, identify, based on a matching parameter, first block coefficients of a first frame in the first compressed state and second block coefficients of a second frame in the first compressed state;

compute a set of differential values between the first block coefficients and the second block coefficients;

determine a first number of bits of the set of differential values if entropy encoded;

determine a second number of bits of the second block coefficients if entropy encoded;

compare the first number of bits and the second number of bits to determine which is less;

entropy encode the set of differential values if the first number of bits is less; and entropy encode the second block coefficients if the second number of bits is less.

11. The at least one non-transitory computer-readable storage medium of claim 10 further comprising instructions executable to extract the frames from the media file.

12. The at least one non-transitory computer-readable storage medium of claim 10 further comprising instructions executable to retrieve from storage reference parameters of the media file, wherein the instructions to transcode comprise the instructions executable to transcode the frames based on the reference parameters.

13. The at least one non-transitory computer-readable storage medium of claim 12, wherein the reference parameters comprise a parameter that indicates the first frame as a reference frame for the second frame.

* * * * *